US012445787B1

(12) United States Patent
Manders

(10) Patent No.: US 12,445,787 B1
(45) Date of Patent: Oct. 14, 2025

(54) METHOD FOR OPERATING A HEARING DEVICE, AND HEARING DEVICE SYSTEM

(71) Applicant: Sivantos Pte. Ltd., Singapore (SG)

(72) Inventor: Alastair James Manders, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 19/170,272

(22) Filed: Apr. 4, 2025

(30) Foreign Application Priority Data

Apr. 4, 2024 (EP) .................................. 24 168 452

(51) Int. Cl.
*H04R 25/00* (2006.01)

(52) U.S. Cl.
CPC ......... *H04R 25/453* (2013.01); *H04R 25/507* (2013.01); *H04R 25/604* (2013.01)

(58) Field of Classification Search
CPC ... H04R 25/453; H04R 25/507; H04R 25/604
See application file for complete search history.

(56) References Cited

U.S. PATENT DOCUMENTS 10,200,776 B2 2/2019 Kumar et al.
10,970,868 B2 4/2021 Williams
2020/0275217 A1* 8/2020 Guo ........................ H03G 9/18
2020/0374617 A1 11/2020 Liu et al.
2022/0337949 A1* 10/2022 Damgaard ............. H04R 25/45
2022/0353623 A1* 11/2022 Behrens ............... H04R 25/407

FOREIGN PATENT DOCUMENTS

CN 115250396 A 10/2022

* cited by examiner

*Primary Examiner* — Suhan Ni

(74) *Attorney, Agent, or Firm* — Laurence A. Greenberg; Werner H. Stemer; Ralph E. Locher

(57) ABSTRACT

A signal processor of a hearing device has a feedback canceller for determining and, if present, canceling feedback. A method of operating the hearing device includes retrieving for a predetermined sample period a set of data of the feedback canceller that represents an acoustic feedback path between the speaker and the microphone; reducing an amount of the data within the set of data; applying a denoising step to the set of data; generating a representative set that is representative for the data within the set; inputting the representative set to a neural network that is trained to retrieve from the input data a measure indicating proper or improper positioning of the hearing device within the ear canal; and issuing a notice to a user of the hearing device at least when the measure indicates an improper positioning.

19 Claims, 1 Drawing Sheet

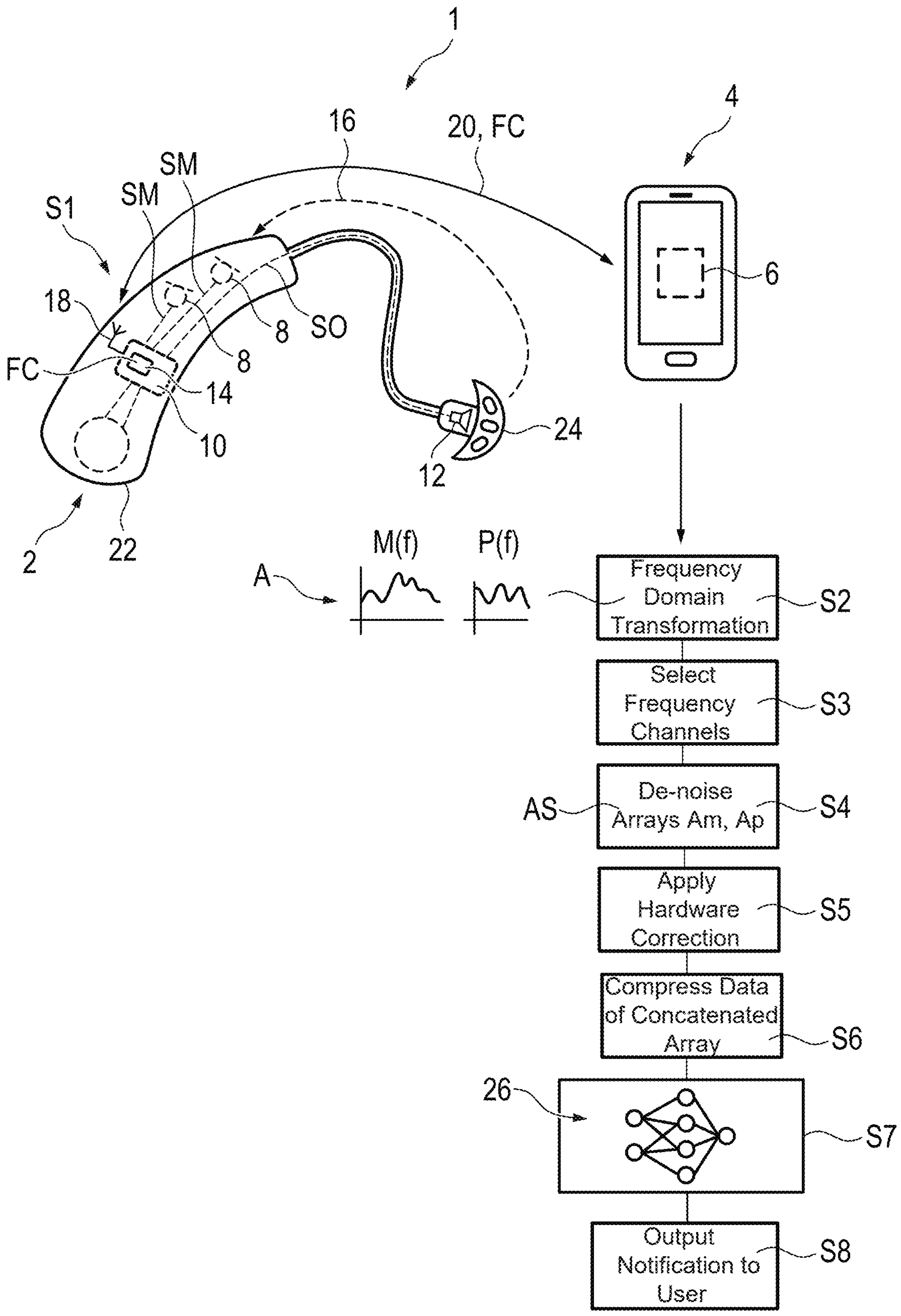
1
4
16
20, FC
SM
SM
S1
18
FC
8
8
SO
14
10
6
24
12
2
22
A
M(f)
P(f)
Frequency Domain Transformation
S2
Select Frequency Channels
S3
AS
De-noise Arrays Am, Ap
S4
Apply Hardware Correction
S5
Compress Data of Concatenated Array
S6
26
S7
Output Notification to User
S8

METHOD FOR OPERATING A HEARING DEVICE, AND HEARING DEVICE SYSTEM

CROSS-REFERENCE TO RELATED APPLICATION

This application claims the priority, under 35 U.S.C. § 119, of European Patent Application EP 24168452.1, filed Apr. 4, 2024; the prior application is herewith incorporated by reference in its entirety.

FIELD AND BACKGROUND OF THE INVENTION

The invention pertains to a method for the operation of a hearing device. The invention further pertains to a hearing device system configured to perform such a method.

Hearing devices are regularly used to output a sound signal to the hearing of the wearer of the hearing device. The output is generated by way of an output transducer, usually acoustically via airborne sound by means of a loudspeaker (also referred to as "receiver"). Such hearing devices are often used as so-called hearing aids. For this purpose, hearing devices usually comprise an acoustic input transducer (in particular a microphone) and a signal processor which is set up to process the input signal (i.e., microphone signal) generated by the input transducer from the ambient sound. Such sound processing is done by applying at least one signal processing algorithm, usually stored in a user-specific manner, in such a way that a hearing loss of the wearer of the hearing device is at least partially compensated. In particular in the case of a hearing aid, the output transducer may be, alternatively to a loudspeaker, a so-called bone-conduction earphone or a cochlear implant, which are set up for mechanical or electrical coupling of the sound signal into the hearing of the wearer. The term hearing devices additionally includes, in particular, devices such as so-called tinnitus maskers, headsets, headphones and the like.

Typical designs of hearing devices, in particular hearing aids, are behind-the-ear ("BTE") and in-the-ear ("ITE") hearing devices. These designations refer to the intended wearing position. In-the-ear hearing aids have a (main) housing that is worn behind the auricle. A distinction can be made between models whose loudspeaker is located in this housing—the sound is usually transmitted to the ear by means of a sound tube that is worn in the ear canal—and models that have an external loudspeaker that is placed in the ear canal. In-the-ear hearing aids, on the other hand, have a housing that is worn in the pinna or even completely in the ear canal.

Usually, hearing devices, especially hearing aids, have been provided by audiologists-specialists who adapt the hearing devices to the users, with respect to a physiological fitting as well as to a functional adaption to the needs of the user in terms of adjusting processing parameters. However, buying hearing aids without having an audiologist at hand may also get more and more interesting in the near future. One point are countries where many people do not have access to an audiologist. Another point are also people who already do a great deal of their shopping over the internet. In both cases, mostly nobody is there to help with physiological fitting. Even if there are hearing devices that do not have personally physiologically adapted parts, especially ear pieces, the respective user can still have struggles with correct positioning of the hearing devices.

SUMMARY OF THE INVENTION

The object of the invention, inter alia, is to provide a hearing device that is easy to wear and the proper positioning relative to the ear canal is readily ascertainable.

With the above and other objects in view there is provided, in accordance with the invention, a method of operating a hearing device, which includes a microphone for receiving ambient sound, a signal processor for processing a microphone signal based on the received ambient sound into an output signal, a speaker for outputting the output signal, and the signal processor including a feedback canceller for determining and, if present, canceling feedback. The method comprises the following steps:

- retrieving for a predetermined sample period a set of data of the feedback canceller that represents an acoustic feedback path between the speaker and the microphone;
- applying at least one step of reducing an amount of data within the set of data;
- applying a denoising step to the set of data;
- generating a representative set that is representative for the data within the set of data;
- inputting, directly or indirectly, the representative set to a neural network that is trained to retrieve from the input data a measure indicating a proper positioning or an improper positioning of the hearing device within the ear canal; and
- issuing a notice to a user of the hearing device when the measure indicates an improper positioning of the hearing device.

The method according to the invention is for the operation of a hearing device (especially a hearing aid). That hearing device comprises a microphone for the reception of ambient sound, a signal processor for processing a microphone signal based on the received ambient sound into an output signal and a speaker for outputting the output signal. The hearing device's signal processor comprises a feedback canceller for determining and, if present, cancelling of feedback. The method comprises the steps of retrieving, for a predetermined sample period, a set of data of the feedback canceller that represents an acoustic feedback path between the speaker and the microphone and, especially, applying several manipulation steps to that set of data or a further measure derived from that set of data. As such manipulation steps the method further comprises applying at least one step of reducing an amount of the data within the set of data, applying a denoising step to the set of data, generating (especially from that set of data) a representative set that is representative for the data within the set, and inputting directly or indirectly the representative set to a neural network that is trained to retrieve from the input data a measure indicating a proper or improper positioning (also: "seating") of the hearing device within the ear canal. As a further step, the method comprises issuing a notice to a user of the hearing device depending on the measure indicating the proper or improper positioning.

In particular, the manipulation steps mentioned above are applied to the data within the set of data.

In general, the method according to the invention serves to discover the proper or improper seating of an ear piece of the hearing device within the ear canal. However, the method described above also comprises data harvesting and manipulation steps that enable a streamlined usage of a neural network. For that, expediently, the method according to the invention provides for data reduction and denoising. The resulting input data make it possible to use a neural network that does not need a high amount of processing power within the respective processor. Thus, an energy efficient and/or time efficient determination of the proper seating of the hearing device may be found. Not only an efficient determination process is provided by the invention but also a way of how to determine the seating situation of the hearing device without the need to rely on reference values for the respective wearer that would have to be set by a specialist. Thus, the method presented here and in the following enables also for users who do not have experience with hearing devices (especially hearing aids) to find the proper position of the hearing device in the ear canal.

According to a preferred embodiment of the method, the data retrieved from the feedback canceller comprise—especially, are—adaptive filter coefficients. These adaptive filter coefficients are determined by the feedback canceller, in particular for applying these in a respective adaptive filter in order to reduce or block feedback. Further, these adaptive filter coefficients are an encoded representation (or in other word some kind of mathematical description) of the acoustic feedback path.

In using the data determined by the feedback canceller, especially the adaptive filter coefficients mentioned before, there is no need to determine extra or separate measures that could be used for determination of the proper seating of the hearing device. Especially, since the adaptive filter coefficients depend on the acoustic path between the speaker and the microphone, the filter coefficients also include an (at least implicit) information about the position (seating) of the hearing device relative to the ear. The more improperly seated the hearing device is the more feedback will occur and vice versa. Feedback cancellation, however, is a topic most hearing devices are concerned with and, therefore, a feedback canceller is usually present, anyway.

Preferably, the notice to the user of the hearing device is issued at least when the measure indicates an improper positioning. However, additionally or alternatively, the measure indicating proper or improper seating may also be used for triggering other features of the hearing device. One example may be triggering a start up melody forwarded by the hearing device when proper positioning is derived by the method described herein. In other words, the hearing device would be controlled to issue a specific tune when activated and seated properly in its designated wearing position.

According to an expedient embodiment of the method, the set of data retrieved from the feedback canceller is transformed to the frequency domain before applying any further data manipulation steps. Such transformation into the frequency domain makes manipulation of data which is frequency dependent easier.

Preferably, the set of data transformed to the frequency domain contains a plurality of magnitude arrays and phase arrays. A "magnitude array" is preferably understood, here and in the following, as a list of numbers that describes the values of a feedback path magnitude-response curve at different frequency points. For example, the magnitude-response of an acoustic feedback path (at a particular time instant) is 1 dB, 2 dB and 3 dB, at frequencies of 100 Hz, 1 kHz, and 5 kHz, respectively. As long as the respective frequency points are known (i.e. 100 Hz, 1 kHz and 5 kHz) this information may be presented as a numerical "array" such as [1, 2, 3]. Usually, within a system as a hearing device, it is no problem to use fixed frequency points throughout signal analysis. Therefore, the frequency points may be set as fixed within that "system". The magnitude arrays used herein contain, in particular, a larger number of frequency points (64 points, rather than 3 as in the above example). Thus, a large range of different frequencies may be covered. As an alternative to the wording "array" vector may be used, also. In an analog way, the term "phase array" used, that instead describes the phase-response of an acoustic feedback path, since any single acoustic feedback path is characterized by both a magnitude-response and a phase-response. Note that a magnitude-response curve is described in units of dB as mentioned above, but a phase-response instead has units of angle, in radians.

According to an expedient embodiment of the method, a hardware correction curve is subtracted from the representative set in order to compensate for device specific frequency-shaping effects. That step makes it possible, that a so to say neutral or "universal" representative set is fed to the neural network. Universal in that case is to be understood preferably as "cleansed" at least in parts from the influence of the respective specific hearing device so that the resulting neutral representative set might be retrieved from any hearing device model (at least regarding the parts that have been "cleansed"). The hardware correction curve (or function) is preferably determined empirically for each model of hearing devices. The hardware correction curve includes information of the acoustic behavior of the respective hearing device model, e.g., its characteristic feedback response and/or its respective frequency-shaping behavior at its input microphone(s). Preferably, such hardware correction curve is only applied to the magnitude arrays. In particular, the hardware correction curve consists of a combination of a frequency response curve of the receiver and a frequency-shaping curve of the device itself, measured in free-field conditions. These two curves are preferably added together. Also, both curves are standard measurements that, preferably, are obtained for all new hearing device models, during development.

According to a further expedient embodiment of the method, especially after subtraction of the correction curve, a principal component analysis transformation is applied to the representative set within (or as) a step of reducing the amount of data. Such a principal component analysis transformation is used to reduce the dimensionality of the set of data, especially of the representative set. Preferably, the dimensionality is reduced by a factor of 2 to 4. Such a factor has proven to lead to stable and yet efficient readouts of the neural network which is fed with the resulting data after such principal component analysis transformation. Therefore, the neural network may be chosen form a quite efficient (i.e., a very small regarding its need of operating power) one.

According to a further development, before applying the principal component analysis transformation, magnitude and phase arrays are joined (concatenated) together, and, thus, a joint representative set is generated. "Concatenate" in the context of two arrays specifically means "join together". E.g., if an array [1, 2, 3] is concatenated with another array [4, 5, 6], the resulting array is [1, 2, 3, 4, 5, 6]. Preferably, the magnitude and phase arrays are joined together after the above-mentioned hardware correction curve has been subtracted. Thus, preferably, the principal component analysis transformation is applied to the joint representative set comprising the concatenated averaged arrays of magnitude and phase.

During a sample period, preferably, round about 30 read outs of the feedback canceller are retrieved, i.e., the respective set of data comprises 30 magnitude arrays and phase arrays (especially, after frequency transformation). Preferably, at least ten such readouts are retrieved for each one set of data.

According to a preferred embodiment of the method, a time averaging is applied to the set of data of the respective sample period for the denoising step and for generating the representative set. I.e., especially a mean value is calculated. In particular, as mentioned before, the set of data encompasses a plurality, especially about 30, of—preferably consecutive—magnitude and phase arrays. These magnitude and phase arrays are averaged over the time of the sample period (i.e., over their number). By doing that, the plurality of magnitude and phase arrays are further on resembled (or represented) by a respective one averaged (or smoothed) magnitude and an averaged phase array (which especially, together, form the above-mentioned representative set). That is, the generation of the representative set is accomplished within the denoising, especially by the denoising, at least by making use of the time averaging. The averaging denoises the set of data from random fluctuations. However, other comparable denoising methods may be done. That averaging is performed, preferably, before the concatenation of the respective magnitude and phase arrays.

According to a further expedient embodiment of the method, especially before the denoising step, frequency channels of predetermined high and low frequency bands are discarded from the set of data. This is done especially as a further (i.e., further to the aforementioned step of principal component analysis) step of reducing the amount of data. Preferably, the frequency bands removed from the set of data are chosen by their impact on feedback. Usually, "bass" components, i.e., very low frequencies do not have a big influence on acoustic feedback since these may also impact by body born sound and/or show only a low (especially negligible) correlation between the position of the hearing device and feedback. Also, high frequencies also do have little impact on acoustic feedback. Preferably, a frequency range of interest is chosen from about 650 Hz to 11000 Hz (e.g., +/−100 Hz, respectively). Frequencies (or frequency channels) outside of that range are discarded for the purpose of the method described here and in the following, expediently.

According to a preferred embodiment of the method, as the neural network a shallow feed-forward multi-layer perceptron ("MLP") neural network is used. "Shallow", in that context, is preferably understood such that the MLP neural network contains no more than a few, e.g. three or fewer, hidden layers. Preferably, the MLP neural network contains two or only one hidden layer(s).

According to a further preferred embodiment of the method, the magnitude and phase arrays have a length (also referred to as "size") of 64. That is, the respective array has a number of 64 elements.

With the above and other objects in view there is also provided, in accordance with the invention, a hearing device system, which includes: a hearing device (especially a hearing aid) which comprises the microphone for the reception of ambient sound and for outputting a microphone signal that is based on the received ambient sound, and a signal processor for processing the microphone signal based on the received ambient sound into an output signal, and a speaker for outputting the output signal. The signal processor comprises a feedback canceller for determining and, if present, cancellation of feedback. The hearing device system also comprises a controller that is configured to perform the method according to the method described above.

According to a preferred embodiment, the controller of the hearing device system may be a controller of the hearing device itself, e.g., a microprocessor comprising the signal processor. In that case, the processing described here and in the following is performed on the hearing device itself. This makes up for the hearing device being a standalone device without the need of additional hardware. However, according to an alternative embodiment, the controller is separate from the hearing device and preferably part of a smart device, especially a smartphone or a tablet that is connected to the hearing device in the sense of data transmission. In the latter case, the hearing device transmits the set of data retrieved from the feedback canceller to the controller, e.g. the smart device. Preferably a wireless connection is used for that data transmission. The benefit of the controller being part of an external device to the hearing device is that the data manipulation and handling described before does not have to be performed on the hearing device side which may contribute to an energy efficient operation. On the other hand, especially in the case of a smartphone or tablet, modern smart device microprocessors already are configured for processing of artificial intelligence algorithms such as in a neural network. Also, updating a software of such a smart device is mostly realized more easily (e.g., by way of automated over the air updates) compared to updating the firmware of a hearing device, especially a hearing aid.

Preferably, the hearing device is configured to only retrieve the set of data from the feedback canceller (especially, the adaptive filter coefficients) and transmit these directly (i.e., without further processing) to the external controller. The external controller on the other hand, is preferably configured to transmit the result of the neural network, i.e., the measure indicating a proper or improper positioning of the hearing device, back to the hearing device such that the hearing device may issue the notice at least if the result is an improper positioning. Alternatively or additionally, the external controller, especially in the case of the smart device is configured to display or otherwise provide the result the information regarding the proper or improper positioning to the user (e.g. via a display or acoustically).

Thus, the hearing device system may be the hearing device for itself, but optionally comprises, at least during its intended state of operation, also the external controller, preferably the smart device comprising said controller.

The hearing device system also shares the advantages of the method and even bodily features that result from the method steps described above.

The conjunction "and/or" is to be understood here and in the following in particular in such a way that the features linked by this conjunction can be formed both together and as alternatives to each other. In the alternative, the expression "at least one of A or B" may be used, which encompasses in its interpretation "A, or B, or A+B."

Other features which are considered as characteristic for the invention are set forth in the appended claims.

Although the invention is illustrated and described herein as embodied in a method for operation of a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE FIGURE

The sole drawing FIGURE is a schematic illustration of a hearing device system during the performance of an operational method.

DETAILED DESCRIPTION OF THE INVENTION

The hearing device system 1 that is shown in the drawing FIGURE comprises a hearing device, here in the form of a hearing aid 2. Further, the hearing device system 1 comprises a control device external to the hearing aid 2. The control device, in the present embodiment, is represented by a smartphone 4. The smartphone 4 comprises a microprocessor that, during intended operation mode, executes a control application for the hearing aid 2, referred to as "app 6."

The hearing aid 2 comprises two microphones 8 for the reception of ambient sound (that during intended operation mode may resemble a directional microphone), a signal processor 10 for processing a microphone signal SM based on the received ambient sound into an output signal SO and a speaker 12 for outputting the output signal SO. The signal processor 10 comprises a feedback canceller 14 for determining and, if present, cancellation of feedback (indicated by a broken arrow 16 from the speaker 12 to the microphones 8). Further, the hearing aid 2 comprises a transmitter 18 for wireless data communication (indicated by arrow 20) with the smartphone 4. The speaker 12 is a so-called external receiver unit. I.e., the speaker 12 is located outside a housing 22 of the hearing aid 2 which is to be worn behind an ear of the user, whereas the speaker 12 is to be worn inside the ear canal of the user.

In order to determine, whether the speaker 12, especially an ear tip 24 of the hearing aid 2, is inserted properly inside the ear canal of the user, the hearing device system 1, especially the hearing aid 2 and the smartphone 4, respectively, are configured to perform a method described in more detail below.

Generally, the feedback canceller 14 is configured to ascertain an acoustic feedback path between the speaker 12 and the microphones 8. For that the feedback canceller 14 analyzes the microphone signals SM in a way known to those of skill in the art. The outcome of such analysis are adaptive filter coefficients FC by which an adaptive filter is configured to cancel or attenuate feedback.

The method for determining the status of the position or alignment of the speaker 12 or the ear tip 24, respectively, comprises several steps. These steps comprise retrieving data from the feedback canceller 14, applying several manipulation steps to that data to derive an input measure and feed that input measure to an artificial intelligence algorithm that is trained to output information about proper or improper seating of the speaker 12 within the ear canal.

Within a first step S1 the hearing aid 2, especially its signal processor 10 retrieves within a sample period a set of data of the feedback canceller 14. That data are the adaptive filter coefficients FC that represent the acoustic feedback path between the speaker 12 and the microphones 8. The set of data, thus, comprises for the sample period several subsets of filter coefficients FC that are determined consecutively. The hearing aid 2 transmits that set of filter coefficients FC to the smartphone 4. Preferably, there the filter coefficients FC are stored to a buffer.

Within a second step S2 the app 6 of the smartphone 4 calculates for each subset of filter coefficients FC its representation in the frequency domain, i.e., performs a frequency domain transformation. The results are arrays Am of a magnitude M(f) and arrays Ap of a phase P(f) for each subset. For each sample period, e.g., 30 subsets of filter coefficients FC are determined. Thus, the length of the sample period is preferably determined by the sampling rate of the system, especially the signal processor 10 and/or the smartphone 4.

Within a third step S3, a frequency channel selection is applied to the arrays Am and Ap, wherein frequency channels of low (i.e., below 650 Hz) and high frequencies (i.e., higher than 11000 Hz) are discarded. This results in a reduction of data amount, especially since those discarded frequencies usually do not transport information of interest for the detection of proper or improper seating of the speaker 12.

For applying denoising to the arrays Am and Ap, within a fourth step S4, the number of arrays Am and Ap of the respective sample period are averaged. This results in a "time smoothing" and, thus, removing noise effect by a process of destructive interference. The averaged or "smoothed arrays" of magnitude and phase are further on referred to as smoothed arrays ASm and ASp, respectively. I.e., the time averaging is performed separately on the magnitude and phase arrays Am and Ap, respectively, so at this point the processing results in one smoothed array ASm of the magnitude M(f) and one averaged array ASp of the phase P(f). These two smoothed arrays ASm and ASp are separate entities. The smoothed arrays ASm and ASp resemble a "representative set" of data.

In a fifth step S5, a hardware correction curve is subtracted from the representative set of data, particularly from the smoothed array ASm of the magnitude M(f), only. That hardware correction curve is a transfer function that is empirically determined for each model of hearing devices and takes into account frequency shaping effects specific to the respective hearing device model. Thereby, the smoothed array ASm is cleansed of specific design effects of the respective hearing device model (e.g., geometric effects of the housing 22 and the like).

After subtracting the hardware correction curve (only) from the smoothed array ASm of the magnitude, the resulting (corrected) array is then concatenated, i.e. joined end-to-end, with the smoothed array ASp of the phase, creating a concatenated (or "resulting") array.

To further reduce the amount of data, within a sixth step S6, a data compression is used upon the resulting array. Specifically, a principal component analysis transformation is applied to the resulting array. That principal component analysis transformation is also an artificial intelligence algorithm and pretrained by respective training data to reduce the dimensionality (i.e. a smaller number of elements inside; however, especially, having nearly the same information content as the earlier concatenated array) within the respective resulting array, creating a "compressed set" of data. The dimensionality is reduced for example by a factor of about two (or also up to four).

The compressed set of data from the sixth step S6 is then fed within a seventh step S7 to a "shallow" feed-forward MLP (multi-layer perceptron) neural network 26 containing, e.g., one or two hidden layer(s). The MLP neural network 26 is trained by data of different users and configured to output a binary information whether the seating of the hearing aid 2, especially its speaker 2, is proper or improper.

That output is used, within an eighth step S8, to inform the user about the seating of the hearing aid 2. At least, the app 6 prompts the hearing aid 2 and/or the smartphone 4 to output a notification to the user when the speaker 12 is seated improperly.

According to an additional embodiment, that method could also be used to track a quality of the ear tip 24, especially by using a memory wherein the outputs of the neural network are stored. In that case, the neural network 26 is preferably configured to output more than a binary information, but also some graduations (such as seating is proper but tending to improper, and the like). By analyzing the stored outputs a trend may be derived to a more and more improper seating. That could hint to a degradation of the ear tip 24.

It will be understood that the subject matter of the invention is not limited to the exemplary embodiment described above. Rather, further embodiments of the invention may be derived by those of skill in the art from the above description.

The following is a summary list of reference symbols and numerals and the corresponding structure used in the above description of the invention:

1 hearing device system
2 hearing aid
4 smartphone
6 app
8 microphone
10 signal processor
12 speaker
14 feedback canceller
16 arrow
18 transmitter
20 arrow
22 housing
24 ear tip
26 neural network
SM microphone signal
SO output signal
FC filter coefficient
A array
M(f) magnitude
P(f) phase
ASm smoothed array
ASp smoothed array
S1-S8 method steps

The invention claimed is:

1. A method of operating a hearing device, the hearing device having a microphone for receiving ambient sound, a signal processor for processing a microphone signal based on the received ambient sound into an output signal, a speaker for outputting the output signal, and the signal processor including a feedback canceller for determining and, if present, canceling feedback, the method comprising:

retrieving for a predetermined sample period a set of data of the feedback canceller that represents an acoustic feedback path between the speaker and the microphone;

applying at least one step of reducing an amount of data within the set of data;

applying a denoising step to the set of data;

generating a representative set that is representative for the data within the set of data;

inputting, directly or indirectly, the representative set to a neural network that is trained to retrieve from the input data a measure indicating a proper positioning or an improper positioning of the hearing device within the ear canal; and issuing a notice to a user of the hearing device when the measure indicates an improper positioning of the hearing device.

2. The method according to claim 1, which comprises also issuing a notice to the user of the hearing device when the measure indicates a proper positioning of the hearing device.

3. The method according to claim 1, wherein the data retrieved from the feedback canceller comprise adaptive filter coefficients determined by the feedback canceller.

4. The method according to claim 1, which comprises transforming the set of data retrieved from the feedback canceller to the frequency domain before applying any further data manipulation steps.

5. The method according to claim 4, wherein the set of data transformed to the frequency domain contains a plurality of magnitude arrays) and phase arrays).

6. The method according to claim 5, wherein the magnitude array) and the phase array) have a length of 64.

7. The method according to claim 1, which comprises subtracting from the representative set a hardware correction curve to compensate for device specific frequency-shaping effects.

8. The method according to claim 7, which comprises, after subtracting the correction curve, applying within the step of reducing the amount of data a principal component analysis transformation to the representative set.

9. The method according to claim 8, which comprises using the principal component analysis transformation to reduce a dimensionality of the set of data by a factor of two to four.

10. The method according to claim 8, which comprises, before applying the principal component analysis transformation, joining together the averaged magnitude and phase arrays for a joint representative set.

11. The method according to claim 7, wherein the step of reducing the amount of data comprises applying a principal component analysis transformation to the representative set.

12. The method according to claim 11, which comprises using the principal component analysis transformation to reduce a dimensionality of the set of data by a factor of two to four.

13. The method according to claim 1, wherein steps of denoising and of generating the representative set comprise applying an averaging to the set of data of the respective sample period.

14. The method according to claim 13, wherein the step of averaging comprises a time averaging.

15. The method according to claim 1, which comprises performing a further step of reducing the amount of data by discarding frequency channels of predetermined high and low frequency bands from the set of data.

16. The method according to claim 15, which comprises carrying out the further step of reducing the amount of data before the denoising step.

17. The method according to claim 1, which comprises using as the neural network a shallow feed-forward multilayer perceptron neural network containing only few hidden layers.

18. The method according to claim 17, wherein the neural network contains three or fewer hidden layers.

19. A hearing device system, comprising:

a hearing device comprising a microphone for receiving ambient sound, a signal processor for processing a microphone signal based on the ambient sound received by said microphone into an output signal, a speaker for outputting the output signal;

said signal processor including a feedback canceller configured for determining and, if present, canceling feedback; and a controller configured to perform the method according to claim 1.

* * * * *